United States Patent
Rosenschild et al.

(10) Patent No.: US 11,363,678 B2
(45) Date of Patent: Jun. 14, 2022

(54) SELF-OPTIMIZATION OF MOBILE NETWORKS USING A DISTRIBUTED ANTENNA SYSTEM

(71) Applicant: CommScope Technologies LLC, Hickory, NC (US)

(72) Inventors: Klaus Uwe Rosenschild, Donauwörth (DE); Arndt Paul Pischke, Huisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/944,974

(22) Filed: Jul. 31, 2020

(65) Prior Publication Data
US 2021/0051765 A1    Feb. 18, 2021

Related U.S. Application Data

(60) Provisional application No. 62/888,071, filed on Aug. 16, 2019.

(51) Int. Cl.
*H04W 88/08* (2009.01)
*H04B 7/022* (2017.01)
(Continued)

(52) U.S. Cl.
CPC .......... *H04W 88/085* (2013.01); *H04B 7/022* (2013.01); *H04B 10/25753* (2013.01); *H04W 24/02* (2013.01)

(58) Field of Classification Search
CPC .... H04W 88/085; H04W 24/02; H04B 7/022; H04B 10/25753; H04B 7/024; H04B 10/25754
See application file for complete search history.

(56) References Cited

U.S. PATENT DOCUMENTS 7,286,507 B1    10/2007 Oh et al.
7,480,486 B1    1/2009 Oh et al.
(Continued)

FOREIGN PATENT DOCUMENTS

WO    2014014689 A1    1/2014

OTHER PUBLICATIONS

"Low-Complexity Load Balancing with a Self-Organized Intelligent Distributed Antenna System"; Wireless Pers Commun (2014) 79: 969-985); Hejazi et al.; Jun. 27, 2014 (Year: 2014).*
(Continued)

*Primary Examiner* — Benjamin H Elliott, IV
(74) *Attorney, Agent, or Firm* — Fogg & Powers LLC

(57) ABSTRACT

A telecommunications system includes a distributed antenna system (DAS) having a master unit communicatively coupled to remote antenna units (RAUs) located remotely from the master unit, the master unit communicatively coupled to base stations; and a controller communicatively coupled to the base stations and the DAS. The controller is configured to obtain current base station performance parameter(s) including base station load data or overhead communications data from the base stations; determine an updated configuration for the DAS based on the current base station performance parameter(s), the configuration of the DAS comprising an assignment of the RAUs to one or more coverage zones and an assignment of a zone profile to each of the one or more coverage zones; and adjust the assignment of RAUs to the one or more coverage zones and/or the zone profile of each coverage zone to correspond to the determined updated configuration for the DAS.

20 Claims, 4 Drawing Sheets

(51) Int. Cl.
*H04B 10/2575* (2013.01)
*H04W 24/02* (2009.01)

(56) References Cited

U.S. PATENT DOCUMENTS

| | | | |
|---|---|---|---|
| 7,848,731 B1 | 12/2010 | Dianda et al. | |
| 8,406,759 B2 | 3/2013 | Ryan et al. | |
| 8,457,631 B2 | 6/2013 | Choksi et al. | |
| 8,532,580 B2 | 9/2013 | Elliott et al. | |
| 8,583,182 B2 | 11/2013 | Piirainen et al. | |
| 8,599,794 B2 | 12/2013 | Ahmadi | |
| 8,620,302 B2 | 12/2013 | Gunnarsson et al. | |
| 9,572,051 B2 | 2/2017 | Tarlazzi et al. | |
| 9,820,172 B2 | 11/2017 | Tarlazzi et al. | |
| 10,104,558 B2 | 10/2018 | Tarlazzi et al. | |
| 10,375,587 B2 | 8/2019 | Tarlazzi et al. | |
| 2002/0151309 A1* | 10/2002 | Johnson | H04W 16/02 455/515 |
| 2006/0056448 A1 | 3/2006 | Zaki et al. | |
| 2008/0199183 A1 | 8/2008 | Liu et al. | |
| 2008/0274735 A1 | 11/2008 | Choksi et al. | |
| 2009/0036116 A1 | 2/2009 | Kim et al. | |
| 2010/0041341 A1* | 2/2010 | Stratford | H04L 5/14 455/67.14 |
| 2011/0105184 A1* | 5/2011 | Piirainen | H04B 7/022 455/562.1 |
| 2011/0105185 A1 | 5/2011 | Heald | |
| 2011/0268033 A1 | 11/2011 | Boldi et al. | |
| 2012/0057572 A1 | 3/2012 | Evans et al. | |
| 2012/0196591 A1 | 8/2012 | O'Keeffe et al. | |
| 2013/0005297 A1* | 1/2013 | Sanders | H04W 4/029 455/406 |
| 2013/0031036 A1 | 1/2013 | Kojima | |
| 2013/0040683 A1 | 2/2013 | Siomina et al. | |
| 2013/0051278 A1* | 2/2013 | Watkins | H04W 28/0247 370/254 |
| 2013/0071112 A1* | 3/2013 | Melester | H04B 1/006 398/38 |
| 2013/0142054 A1* | 6/2013 | Ahmadi | H04B 7/024 370/252 |
| 2013/0170347 A1 | 7/2013 | Zhang et al. | |
| 2013/0170362 A1 | 7/2013 | Futaki et al. | |
| 2013/0189941 A1 | 7/2013 | Abbott et al. | |
| 2013/0194961 A1 | 8/2013 | Kang et al. | |
| 2013/0201916 A1* | 8/2013 | Kummetz | H04W 16/26 370/328 |
| 2013/0225216 A1 | 8/2013 | Calin et al. | |
| 2013/0331079 A1 | 12/2013 | Rácz et al. | |
| 2014/0024402 A1 | 1/2014 | Singh | |
| 2014/0031049 A1 | 1/2014 | Sundaresan et al. | |
| 2014/0094159 A1 | 4/2014 | Raleigh et al. | |
| 2014/0119312 A1 | 5/2014 | Doetsch et al. | |
| 2014/0162664 A1* | 6/2014 | Stapleton | H04W 16/04 455/445 |
| 2014/0198684 A1 | 7/2014 | Gravely et al. | |
| 2014/0242999 A1 | 8/2014 | Goshen et al. | |
| 2015/0078303 A1 | 3/2015 | Jongren et al. | |
| 2015/0310964 A1 | 10/2015 | Larson et al. | |
| 2016/0057648 A1 | 2/2016 | Franza et al. | |
| 2017/0026857 A1* | 1/2017 | Kummetz | H04W 24/02 |
| 2017/0244475 A1 | 8/2017 | Malach | |
| 2017/0303180 A1* | 10/2017 | Kapoulas | H04W 36/0094 |
| 2018/0167828 A1* | 6/2018 | Xu | H04W 16/32 |
| 2018/0352518 A1 | 12/2018 | Tarlazzi et al. | |
| 2019/0115650 A1* | 4/2019 | Barker | H01Q 3/40 |
| 2021/0051765 A1* | 2/2021 | Rosenschild | H04W 88/085 |

OTHER PUBLICATIONS

"A Self-Organized Network for Load Balancing Using Intelligent Distributed Antenna System"; Canadian Journal of Electrical and Computer Engineering, vol. 38, No. 2, Spring 2015; Hejazi et al.; 2015 (Year: 2015).*

International Searching Authority, "International Search Report and Written Opinion from PCT Application No. PCT/US2020/044520", from Foreign Counterpart to U.S. Appl. No. 16/944,974, dated Oct. 27, 2020, pp. 1 through 12, Published: WO.

"3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3rd Generation Partnership Project, 2011, pp. 1 through 21, 3GPP Organizational Partners.

"Self-Optimizing Networks in 3GPP Release 11: The Benefits of SON in LTE", 4G Americas, Oct. 2013, pp. 1 through 62.

"Self-Optimizing Networks: The Benefits of SON in LTE", 4G Americas, Jul. 2011, pp. 1 through 69.

European Patent Office, "Communication pursuant to Article 94(3) EPC from EP Application No. 15751423.3", from Foreign Counterpart to U.S. Appl. No. 14/760,402, dated Sep. 6, 2019, pp. 1 through 7, Published: EP.

European Patent Office, "Communication pursuant to Article 94(3) from EP Application No. 15751423.3 dated Nov. 8, 2018", from Foreign Counterpart to U.S. Appl. No. 14/760,402, Nov. 8, 2018, pp. 1 through 7, Published: EP.

European Patent Office, "Communication pursuant to Rule 71(3) EPC from EP Application No. 15751423.3", from Foreign Counterpart to U.S. Appl. No. 14/760,402, dated May 20, 2020, pp. 1 through 37, Published: EP.

European Patent Office, "Extended European Search Report from EP Application No. 15751423.3 dated Sep. 25, 2017", from Foreign Counterpart to U.S. Appl. No. 14/760,402, Sep. 25, 2017, pp. 1 through 9, Published: EP.

International Searching Authority, "International Search Report and the Written Opinion of the International Searching Authority from PCT Application No. PCT/US2015/015999 dated May 28, 2015", from Foreign Counterpart to U.S. Appl. No. 14/760,402, May 28, 2015, pp. 1 through 9, Published: KR.

U.S. Patent and Trademark Office, "Notice of Allowance", U.S. Appl. No. 14/760,402, dated Sep. 30, 2016, pp. 1 through 12, Published: US.

U.S. Patent and Trademark Office, "Notice of Allowance", U.S. Appl. No. 15/431,263, dated Jul. 12, 2017, pp. 1 through 7, Published: US.

U.S. Patent and Trademark Office, "Notice of Allowance", U.S. Appl. No. 15/811,445, dated Jun. 8, 2018, pp. 1 through 14, Published: US.

U.S. Patent and Trademark Office, "Notice of Allowance", U.S. Appl. No. 16/160,870, dated Mar. 13, 2019, pp. 1 through 14, Published: US.

U.S. Patent and Trademark Office, "Office Action", U.S. Appl. No. 15/431,263, dated Mar. 22, 2017, pp. 1 through 11, Published: US.

U.S. Patent and Trademark Office, "Office Action", U.S. Appl. No. 16/160,870, dated Nov. 16, 2018, pp. 1 through 13, Published: US.

European Patent Office, "Extended European Search Report from EP Application No. 20200640.9", from Foreign Counterpart to U.S. Appl. No. 14/760,402, dated Dec. 9, 2020, pp. 1 through 10, Published: EP.

* cited by examiner

SELF-OPTIMIZATION OF MOBILE NETWORKS USING A DISTRIBUTED ANTENNA SYSTEM

CROSS-REFERENCE TO RELATED APPLICATIONS

This application claims the benefit of U.S. Provisional Application Ser. No. 62/888,071, filed Aug. 16, 2019, and titled "SELF-OPTIMIZATION OF MOBILE NETWORKS USING A DISTRIBUTED ANTENNA SYSTEM," which is hereby incorporated herein by reference.

BACKGROUND

Mobile cellular networks were traditionally based on a topology that included cells serviced by base stations located within the cells. The base stations each had a sector profile, where a sector is identified by the operator, band, technology, and carrier frequency. In such topologies, base stations in adjacent cells were operated using different frequencies. An individual frequency could be reused by a different base station that was not located in an adjacent cell.

A distributed antenna system (DAS) can be used in such mobile cellular networks to provide multi-operator support and more flexibility with respect to controlling cell capacity compared to traditional topologies with base stations located within the cells. A DAS typically includes a master unit communicatively coupled to one or more base stations and remote antenna units communicatively coupled to the master unit and located remote from the master unit. A single remote antenna unit of a DAS can emit multiple sectors (also referred to as "carriers") from the same operator or from different operators, and the DAS can adjust the number of sectors in a given cell serviced by the remote antenna unit to adjust the available capacity of a cell or coverage zone to service more users, for example. Further, a DAS can be used to create coverage zones having different topologies of coverage where multiple, distinct remote antenna units can emit the same sectors from the same base stations.

SUMMARY

In an example, a telecommunications system comprises a distributed antenna system that includes a master unit communicatively coupled to a plurality of remote antenna units located remotely from the master unit, wherein the master unit is communicatively coupled to a plurality of base stations. The telecommunications system further comprises a controller communicatively coupled to the plurality of base stations and the distributed antenna system. The controller is configured to obtain one or more current base station performance parameters including base station load data or overhead communications data from the plurality of base stations. The controller is further configured to determine an updated configuration for the distributed antenna system based on the one or more current base station performance parameters, wherein the configuration of the distributed antenna system comprises an assignment of the plurality of remote antenna units to one or more coverage zones and an assignment of a zone profile to each coverage zone of the one or more coverage zones. The controller is further configured to adjust the assignment of remote antenna units to the one or more coverage zones and/or the zone profile of each coverage zone to correspond to the determined updated configuration for the distributed antenna system.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
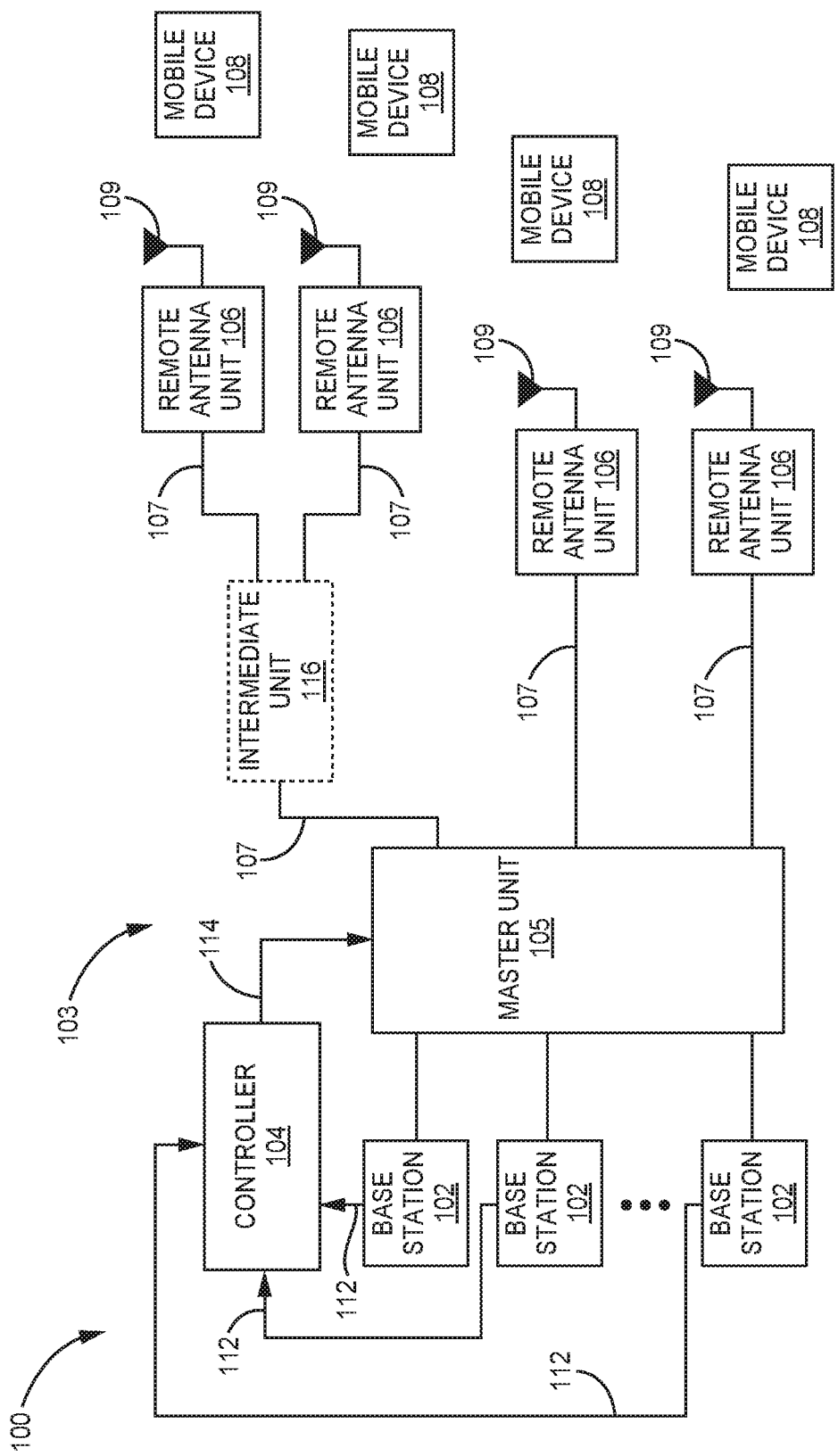
FIG. 1 is a block diagram of an example telecommunications system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Mobile telecommunications network operators determine the particular sector profiles that are needed in the coverage zones of the network during radio network planning. Typically, the profile of the coverage zone is essentially static and does not require change for a long period of time after installation. In some situations, it may be desired to add an additional frequency band to a coverage zone or otherwise modify the coverage zone after installation, but this generally does not occur frequently.

One main benefit of utilizing a DAS is that the coverage zones or cells of a DAS can be extensively reconfigured without requiring significant structural modifications to the DAS itself. An operator of the network can modify the size of a coverage zone or the zone profile of a coverage zone during operation. For example, the size or the zone profile of the coverage zones of a DAS can be modified by reconfiguring the frequency bands provided to each of the remote antenna units in the coverage zones of the DAS. However, current techniques for reconfiguration of a DAS are based on limited data available to a DAS, so these techniques are unlikely to achieve an optimal configuration in all circumstances.

As used herein, the term "sector profile" refers to the characteristics of a single service that is provided in a coverage zone. For example, a sector profile of a particular service can include the operator, band, technology, and carrier frequency for the service.

As used herein, the term "sector" refers to an instance of a "sector profile." For example, a sector of a base station has a particular sector profile. In some examples, different sectors can have the same sector profile (for example, same operator, band, technology, and carrier frequency) or different sector profiles (for example, different operator, band, technology, and/or carrier frequency), but the different sectors are provided by different base stations.

As used herein, the term "zone profile" refers to the set of sectors that are provided in a particular coverage zone of the DAS and the sector profiles of the sectors provided in the particular coverage zone of the DAS. For example, the zone profile for a particular coverage zone can include two sectors, where each sector has a different sector profile.

The examples described herein include systems and methods for automatically determining an updated (or improved) configuration of the coverage zones of the DAS and reconfiguring the DAS accordingly. The examples include a controller that is configured to obtain current base station performance parameters from a plurality of base stations and automatically determine, using a control loop, an updated (or improved) configuration of the DAS based on the current base station performance parameters. The current base station performance parameters include layer 2/layer 3 ("L2/L3") data (referred to herein as "higher-level data") that is generally not available to a DAS. The current base station performance parameters can include, for example, current base station load data or the current overhead communication traffic levels (for example, number of handovers). The controller is configured to modify the configuration of the components of the DAS to correspond to the determined updated (or improved) configuration by providing instructions or commands to one or more components of the DAS. By having access to current base station performance parameters as described herein, the controller has direct knowledge of the current base station performance parameters and does not need to infer data through power measurements or other means typically used with a DAS to determine data for reconfiguring the DAS.

FIG. 1 is a block diagram of an example telecommunications system 100. In the example of FIG. 1, the telecommunications system 100 includes a plurality of base stations 102, a distributed antenna system 103 (DAS), and a controller 104. While a single DAS 103 and controller 104 are shown communicatively coupled to three base stations 102 in the telecommunications system 100 of FIG. 1, it should be understood that this is for ease of illustration and the telecommunications system 100 can include any number of base stations 102, DASs 103, and controllers 104 depending on the desired coverage and capacity for the telecommunications system 100. Further, while the DAS 103 shown in FIG. 1 includes one master unit 105 and four remote antenna units 106, it should be understood that this is for ease of illustration and the telecommunications system 100 can include any number of master units 105 and remote antenna units 106 depending on the desired coverage and capacity for the telecommunications system 100.

In the example of FIG. 1, the DAS 103 includes one or more master units 105 (also referred to as "host units" or "central area nodes" or "central units") and one or more remote antenna units 106 (also referred to as "remote units" or "access points") that are communicatively coupled to the one or more master units 105. In this example, the DAS 103 comprises a digital DAS, in which DAS traffic is distributed between the master units 105 and the remote antenna units 106 in digital form. In other examples, the DAS 103 comprises an analog DAS, in which DAS traffic is distributed between the master units 105 and the remote antenna units 106 in analog form. In other examples, the DAS 103 comprises a hybrid DAS, in which DAS traffic is distributed between the master units and the remote units using a combination of digital and analog form. The DAS 103 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 105 is communicatively coupled to the plurality of base stations 102. One or more of the base stations 102 can be co-located with the respective master unit 105 to which it is coupled (for example, where the base station 102 is dedicated to providing base station capacity to the DAS 103). Also, one or more of the base stations 102 can be located remotely from the respective master unit 105 to which it is coupled (for example, where the base station 102 is a macro base station providing base station capacity to a macro cell in addition to providing capacity to the DAS 103). In this latter case, a master unit 105 can be coupled to a donor antenna in order to wirelessly communicate with the remotely located base station.

The base stations 102 can be implemented in a traditional manner in which a base band unit (BBU) is deployed at the same location with a radio head (RRH) to which it is coupled, where the BBU and RRH are coupled to each other using optical fibers over which front haul data is communicated as streams of digital IQ samples (for example, in a format that complies with one of the Common Public Radio Interface (CPRI) and Open Base Station Architecture Initiative (OBSAI) families of specifications). Also, the base stations 102 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 102 can be implemented as a small cell base station in which the BBU and RRH functions are deployed together in a single package.

The master unit 105 can be configured to use wideband interfaces or narrowband interfaces to the base stations 102. Also, the master unit 105 can be configured to interface with the base stations 102 using analog radio frequency (RF) interfaces or digital interfaces (for example, using a CPRI or OBSAI digital IQ interface). In some examples, the master unit 105 interfaces with the base stations 102 via one or more wireless interface nodes (not shown). A wireless interface node can be located, for example, at a base station hotel, and group a particular part of a RF installation to transfer to the master unit 105.

Traditionally, a master unit 105 interfaces with one or more base stations 102 using the analog radio frequency signals that each base station 102 communicates to and from a mobile device 108 (also referred to as "mobile units" or "user equipment") of a user using a suitable air interface standard. Although the devices 108 are referred to here as "mobile" devices 108, it is to be understood that the devices 108 need not be mobile in ordinary use (for example, where the device 108 is integrated into, or is coupled to, a sensor unit that is deployed in a fixed location and that periodically wirelessly communicates with a gateway or other device). The DAS 103 operates as a distributed repeater for such radio frequency signals. RF signals transmitted from each base station 102 (also referred to herein as "downlink RF signals") are received at the master unit. In such examples, the master unit 105 uses the downlink RF signals to generate a downlink transport signal that is distributed to one or more of the remote antenna units 106. Each such remote antenna unit receives the downlink transport signal and reconstructs a version of the downlink RF signals based on the downlink transport signal and causes the reconstructed downlink RF signals to be radiated from at least one antenna coupled to or included in that remote antenna unit.

In some aspects, the master unit 105 is directly coupled to the remote antenna units 106. In such aspects, the master unit 105 is coupled to the remote antenna units 106 using cables 107. For example, the cables 107 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 108 (also referred to herein as "uplink RF signals") are received at one or more remote antenna units 106. Each remote antenna unit uses the uplink RF signals to generate an uplink transport signal that is transmitted from the remote antenna unit to a master unit. The master unit 105 receives uplink transport signals transmitted from one or more remote antenna units 106 coupled to it. The master unit 105 can combine data or signals communicated via the uplink transport signals from multiple remote antenna units 106 (for example, by digitally summing corresponding digital samples received from the various remote antenna units 106) and generates uplink RF signals from the combined data or signals. In such examples, the master unit 105 communicates the generated uplink RF signals to one or more base stations 102. In this way, the coverage of the base stations 102 can be expanded using the DAS 103.

As noted above, in the example shown in FIG. 1, the DAS 103 is implemented as a digital DAS. In a "digital" DAS, signals received from and provided to the base stations 102 and mobile devices 108 are used to produce digital in-phase (I) and quadrature (Q) samples, which are communicated between the master unit 105 and remote antenna units 106. It is important to note that this digital IQ representation of the original signals received from the base stations 102 and from the mobile units still maintains the original modulation (that is, the change in the amplitude, phase, or frequency of a carrier) used to convey telephony or data information pursuant to the cellular air interface protocol used for wirelessly communicating between the base stations 102 and the mobile units. Examples of such cellular air interface protocols include, for example, the Global System for Mobile Communication (GSM), Universal Mobile Telecommunications System (UMTS), High-Speed Downlink Packet Access (HSDPA), and Long-Term Evolution (LTE) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the example shown in FIG. 1, the master unit 105 can be configured to interface with one or more base stations 102 using an analog RF interface (for example, via the analog RF interface of an RRH or a small cell base station). In some examples, the base stations 102 can be coupled to the master unit 105 using a network of attenuators, combiners, splitters, amplifiers, filters, cross-connects, etc., which is referred to collectively as a point-of-interface (POI) (not shown). This is done so that, in the downlink, the desired set of RF carriers output by the base stations 102 can be extracted, combined, and routed to the appropriate master unit, and so that, in the uplink, the desired set of carriers output by the master unit 105 can be extracted, combined, and routed to the appropriate interface of each base station.

In the example shown in FIG. 1, in the downlink, the master unit 105 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 102. Each portion of wireless radio frequency spectrum can include, for example, a band of wireless spectrum, a sub-band of a given band of wireless spectrum, or an individual wireless carrier.

Likewise, in the uplink, the master unit 105 can produce an uplink analog wireless signal from one or more streams of digital IQ samples received from one or more remote antenna units 106 by digitally combining streams of digital IQ samples that represent the same carriers or frequency bands or sub-bands received from multiple remote antenna units 106 (for example, by digitally summing corresponding digital IQ samples from the various remote antenna units 106), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the example shown in FIG. 1, the master unit 105 can be configured to interface with one or more base stations 102 using a digital interface (in addition to, or instead of) interfacing with one or more base stations 102 via an analog RF interface. For example, the master unit 105 can be configured to interact directly with one or more BBUs using the digital IQ interface that is used for communicating between the BBUs and an RRHs (for example, using the CPRI serial digital IQ interface).

In the downlink, the master unit 105 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 106 used in the DAS 103. In the uplink, the master unit 105 receives uplink streams of digital IQ samples from one or more remote antenna units 106, digitally combining streams of digital IQ samples that represent the same carriers or frequency bands or sub-bands received from multiple remote antenna units 106 (for example, by digitally summing corresponding digital IQ samples received from the various remote antenna units 106), and, if necessary, converts (by re-sampling, synchronizing, combining, separating, gain adjusting, etc.) them into uplink streams of digital IQ samples compatible with the one or more BBUs that are coupled to that master unit 105.

In the downlink, each remote antenna unit 106 receives streams of digital IQ samples from the master unit 105, where each stream of digital IQ samples represents a portion of wireless radio frequency spectrum output by one or more base stations 102. Each remote antenna unit 106 generates, from the downlink digital IQ samples, one or more downlink RF signals for radiation from the one or more antennas coupled to that remote antenna unit 106 for reception by any mobile devices 108 in the associated coverage area. In the uplink, each remote antenna unit 106 receives one or more uplink radio frequency signals transmitted from any mobile devices 108 in the associated coverage area, generates one or more uplink streams of digital IQ samples derived from the received one or more uplink radio frequency signals, and transmits them to the master unit 105.

In some aspects, one or more intermediate units 116 (also referred to as "expansion units" or "transport expansion nodes") can be placed between the master unit 105 and one or more of the remote antenna units 106. This can be done, for example, in order to increase the number of remote antenna units 106 that a single master unit 105 can feed, to increase the master-unit-to-remote-antenna-unit distance, and/or to reduce the amount of cabling needed to couple a master unit 105 to its associated remote antenna units 106. The expansion units are coupled to the master unit 105 via one or more cables 107.

As discussed above, the master unit 105 of the DAS 103 receives downlink signals from the base stations 102, which include sectors from the base stations 102, and distributes or directs the particular sectors to the remote antenna units 106 of particular coverage zones of the DAS 103 based on the desired DAS configuration. A single remote antenna unit 106 is configurable to emit radio frequency signals corresponding to one or more sectors from the same operator or different operators and can operate using multiple frequencies.

Multiple, distinct remote antenna units 106 of the DAS 103 can be combined into a single coverage zone where each of the remote antenna units 106 in the coverage zone are configured to emit the same sectors from one or more base stations 102. The group of remote antenna units 106 combined into a single coverage zone is also referred to as a simulcast group. Within a given coverage zone of the DAS 103, no handover operations are performed even as a mobile device 108 moves throughout the coverage zone.

Figure 2A:
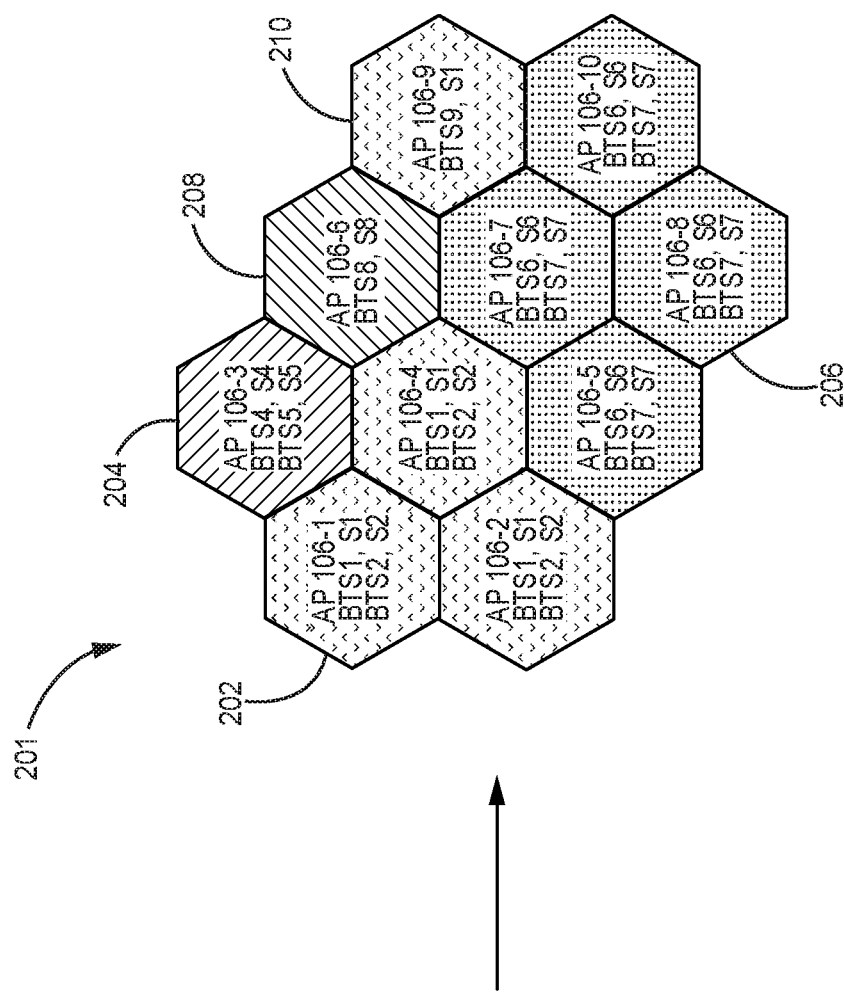
FIGS. 2A-2B are schematic diagrams of example coverage zones and sector allocations for a distributed antenna system in a telecommunications system.

The remote antenna units 106 of the DAS 103 are initially not assigned to a coverage zone and do not have a zone profile established prior to installation. For example, as shown in FIG. 2A, the initial configuration 200 of the remote antenna units 106 includes no allocation of sectors or assignment of the remote antenna units 106 to coverage zones. Based on the radio network planning, the controller 104 (or network operator) assigns the remote antenna units 106 ("APs 106") of the DAS 103 to an initial coverage zone with an initial zone profile according to the planned configuration 201. In the example shown in FIG. 2A, the remote antenna units 106 are initially assigned to different coverage zones, with AP 106-1, AP 106-2, and AP 106-4 being assigned to a first coverage zone 202, AP 106-3 being assigned to a second coverage zone 204, AP 106-5, AP 106-7, AP 106-8, and AP 106-10 being assigned to a third coverage zone 206, AP 106-6 being assigned to a fourth coverage zone 208, and AP 106-9 being assigned to a fifth coverage zone 210. In order to avoid interference, adjacent coverage zones need to have distinct zone profiles. However, non-adjacent coverage zones, such as the first coverage zone 202 and the fifth coverage zone 210, can reuse portions of zone profiles with different sectors.

During operation, the conditions throughout the telecommunications system 100 can change such that a static configuration or a network operator adjusted configuration of a DAS 103 is not adequate to provide desired capacity requirements or performance for the telecommunications system 100. In order to improve and optimize the operation of the DAS 103 (and the telecommunications system 100 generally), the telecommunications system 100 includes a controller 104 configured to implement a control loop to update (or improve) the performance of the telecommunications system 100. In some examples, the control loop is configured as a zero-touch system or process such that no intervention from a human operator is necessary.

In the example shown in FIG. 1, the system includes a controller 104 that is communicatively coupled to each of the base stations 102 via a respective communication link 112 (for example, a USB or Ethernet link) or network (for example, USB, electrical, optical, Ethernet, Synchronous Optical Network (SONET), etc.) and the controller 104 is configured to obtain base station performance parameters from the base stations 102. In some examples, the controller 104 is additionally, or alternatively, communicatively coupled to a network entity (for example, a network router or switch) via a communication link (for example, a USB or Ethernet link), where the network entity is configured to aggregate the base station performance parameters from the base stations 102. The controller 104 is configured to communicate with the base stations 102 and/or the network entity to obtain the base station performance parameters using a communication protocol (such as, for example, Open Network Automation Platform (ONAP), Network Configuration Protocol (NETCONF), Simple Object Access Protocol (SOAP), a proprietary protocol, or other protocols known in the art). It should be understood that other the systems and methods described herein are not limited to a particular communication protocol for obtaining the base station performance parameters.

In some examples, the controller 104 is co-located with the Operations and Maintenance Center for the telecommunications system 100, which should generally include a sufficient amount of processing power and access to the base station performance parameters from the base stations 102 required by the controller 104. In other examples, the controller 104 can be located elsewhere in the telecommunications system 100 as long as there is sufficient processing power to analyze the base station performance parameters from the base stations 102 and determine the updated configuration for the DAS 103 and other components of the telecommunications system 100.

The controller 104 is also communicatively coupled to one or more components of the DAS 103 via one or more communication links 114 (for example, a USB or Ethernet link) or networks (for example, USB, electrical, optical, Ethernet, SONET, etc.). In the example shown in FIG. 1, the controller 104 is communicatively coupled to the master unit 105 of the DAS 103 via a communication link 114 or network. In other examples, the controller 104 is coupled to a controller of the DAS (not shown), which provides a single point of interface for the DAS 103. The controller of the DAS can be positioned within a component of the DAS 103 (such as, for example, the master unit 105) or it can be a separate component of the DAS 103. In other examples, the controller 104 can be communicatively coupled to the remote antenna units 106 via respective communication links or networks in addition to (or instead of) being communicatively coupled to the master unit 105. In some such examples, the controller 104 can be directly connected to the remote antenna units 106 (for example, using dedicated cabling or general-purpose public infrastructure backbone networks to establish virtual cable connections). In other such examples, the controller 104 can be connected to the remote antenna units 106 through a tunneling protocol via a single point of interface for the DAS 103 (for example, a controller or master unit of the DAS). The controller 104 is configured to communicate with the components of the DAS 103 using a communication protocol (such as, for example, ONAP, NETCONF, SOAP, a proprietary protocol, or a protocol known in the art). It should be understood that the systems and methods described herein are not limited to a particular communication protocol for communicating between the controller 104 and one or more components of the DAS 103.

In some examples, the controller 104 and DAS 103 are configured so that the controller 104 is within or has access to a management domain of the DAS 103. In such examples, the controller 104 is configured to include or have access to management-plane functionality for use within the management domain of the DAS 103. For example, the controller 104 can access and modify the configuration of the master unit 105 and/or remote antenna units 106 of the DAS 103.

In some examples, the controller 104 is configured to receive one or more target base station performance parameters as a reference for the control loop implemented by the controller 104. In some examples, the controller 104 is configured to receive target base station load for each base station 102 and/or a target amount of overhead communication traffic (for example, a target number of handovers) for each base station 102 and/or the telecommunications system 100. In some examples, the target base station performance parameters can be provided from the telecommunications network operator via a control channel, graphical user interface, or the like.

The controller 104 is also configured to obtain current base station performance parameters from the plurality of base stations 102 in the telecommunications system 100 via the respective communication links 112 or from a network entity (for example, a network router or switch). In some examples, the current base station performance parameters include usage data for the base station 102 that is L2/L3 data, which is also referred to higher-layer data. The higher-layer data from the base station 102 is demodulated and decoded data and contains control-plane and/or user-plane data. This data is generally not available to a DAS because a DAS generally transports downlink/uplink signals without demodulating or decoding the signals. In some examples, the higher-layer data includes current base station load data and/or the current overhead communication traffic levels. The base station load data can include the percent of capacity for the sectors of the base station 102 that is currently utilized, the available frequencies for the base station, the number of mobiles currently being served by the base station, etc. The overhead communication traffic levels can include the number of handovers or other types of overhead communications for each respective base station 102 in the telecommunications system 100. Other current base station performance parameters could also be obtained by the controller 104.

The controller 104 is configured to determine an updated or improved configuration for the DAS 103 based on the current base station performance parameters. The configuration of the DAS 103 includes an assignment of the remote antenna units 106 to coverage zones and an assignment of base station sectors to particular coverage zones. One or more remote antenna units 106 are assigned to a coverage zone and one or more base station sectors are assigned to each coverage zone. Each remote antenna unit in a particular coverage zone is configured to communicate with user equipment in the coverage zone using the resources of the base station sectors assigned to the coverage zone. In some examples, the assignment of particular sectors to the remote antenna units 106 effectively achieves both the assignment of the remote antenna units 106 to coverage zones and the assignment of the sectors to the coverage zones.

In some examples the controller 104 is configured to compare the current base station performance parameters to the target base station performance parameters and determine the updated or improved configuration of the DAS 103 based on the comparison. In some examples, if the base station load data for a particular sector of a base station 102 indicates that the load on the base station is above a threshold (for example, 50% traffic load), the controller 104 determines modifications to the configuration of the DAS 103 to cause the base station load data to decrease the load on that particular base station. For example, the number of remote antenna units 106 in the coverage zone served by that particular base station 102 can be reduced to decrease the base station load.

In some examples, the controller 104 is configured to determine the updated or improved configuration for the DAS 103 at predetermined intervals, which can be selected by the operator of the telecommunications network 100. For example, the controller 104 can be configured to determine an updated or improved configuration for the DAS 103 on the order of minutes (such as, for example, every 30 minutes). Other intervals could also be used. In other examples, the controller 104 is configured to continuously determine an updated or improved configuration for the DAS 103. However, continuously determining an improved configuration of the DAS 103 may not result in a different configuration of the DAS 103 and could consume processing and power resources.

In some examples, the controller 104 is also configured to determine the updated or improved configuration of the DAS based on other parameters in addition to the higher-layer data discussed above, which can be used to predict future base station load or overhead communications. For example, the controller 104 can obtain statistical data regarding past base station performance parameters, a time of day, and/or known schedules that could affect the capacity requirements for certain coverage areas and predict the future load or overhead requirements based on the schedules. The schedules could include, for example, a train schedule, a schedule of events at a stadium or concert hall, etc. In particular implementations where the DAS 103 provides coverage to a rail track or entertainment venues, these schedules provide information about the amount of potential mobile device users that will be in the coverage area at a particular time.

In some examples, the controller 104 is configured to determine the updated or improved configuration of the DAS 103 using classical optimization algorithms. For example, the controller 104 takes the higher-layer data and the additional data as input parameters, performs calculations (for example, applies one or more transfer functions to the input parameters), and outputs the determined updated configuration of the DAS 103, which includes the zone profiles for the remote antenna units 106 of the DAS 103. In some examples, the controller 104 is configured to determine the updated configuration of the DAS 103 using methods of artificial intelligence, such as a user trained neural network or deep learning algorithm where the controller 104 trains itself to determine the optimum configuration for the DAS 103. In such examples, the controller 104 can use past base station performance parameters, train or venue schedules, and/or statistical data regarding past base station performance parameters as training data. In some examples, the controller 104 is configured to use 90% of training data for training and 10% of the training data for verification.

In some examples, the signals to be re-routed can be pre-defined to some extent by the telecommunications system's owner/operator. For example, a system owner/operator may define a priority scheme where capacity is prioritized to coverage zones where high demand is predicted, such as, for example, at a stadium or concert hall during an event, but redistribute that capacity elsewhere when the stadium or concert hall is empty. Also, it could be the case that sufficient resources to meet the target parameters are not available. In some examples, the network operator or controller can identify coverage zones to prioritize in situations when the resources are not sufficient.

The controller 104 is further configured to modify the configuration of the DAS 103 to correspond to the determined updated or improved configuration of the DAS 103. In some examples, the controller 104 is configured to provide instructions to the master unit 105 or controller of the DAS 103 to cause the master unit 105 or controller of the DAS, respectively, to adjust the configuration of one or more remote antenna units 106 of the DAS 103 to correspond to the determined updated or improved configuration of the DAS 103. In some examples, the controller 104 provides the particular zone profile for each remote antenna unit 106 of the DAS 103, which includes the particular base station sectors to be provided to the remote antenna units 106. In such examples, the master unit 105 is configured to adjust the base station sectors provided to each remote antenna unit 106 to correspond to the particular zone profile determined by the controller 104. In some examples, the master unit 105 is configured to adjust the base station sectors provided to each remote antenna unit 106 by modifying the configuration of switches of a switch matrix.

Figure 2A:
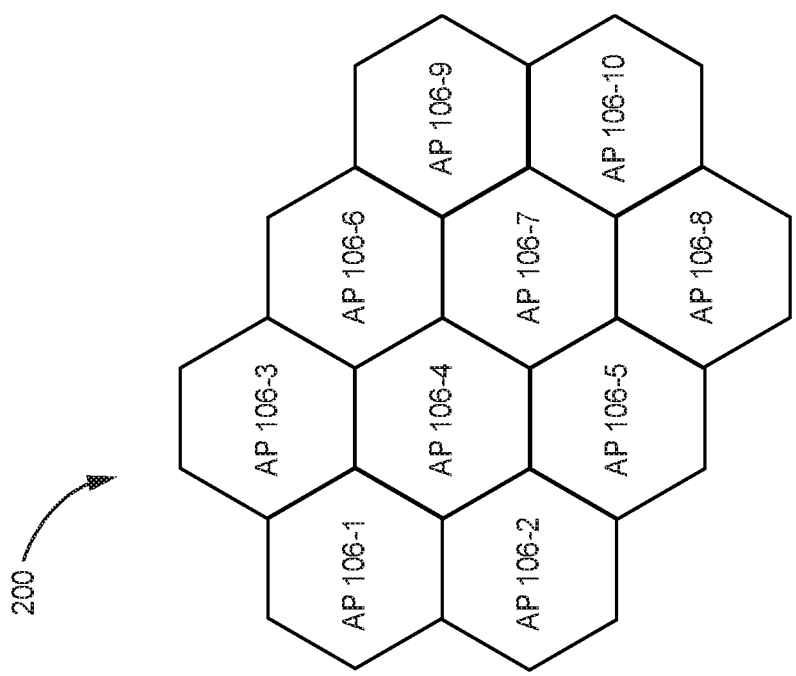
Figure 2B:
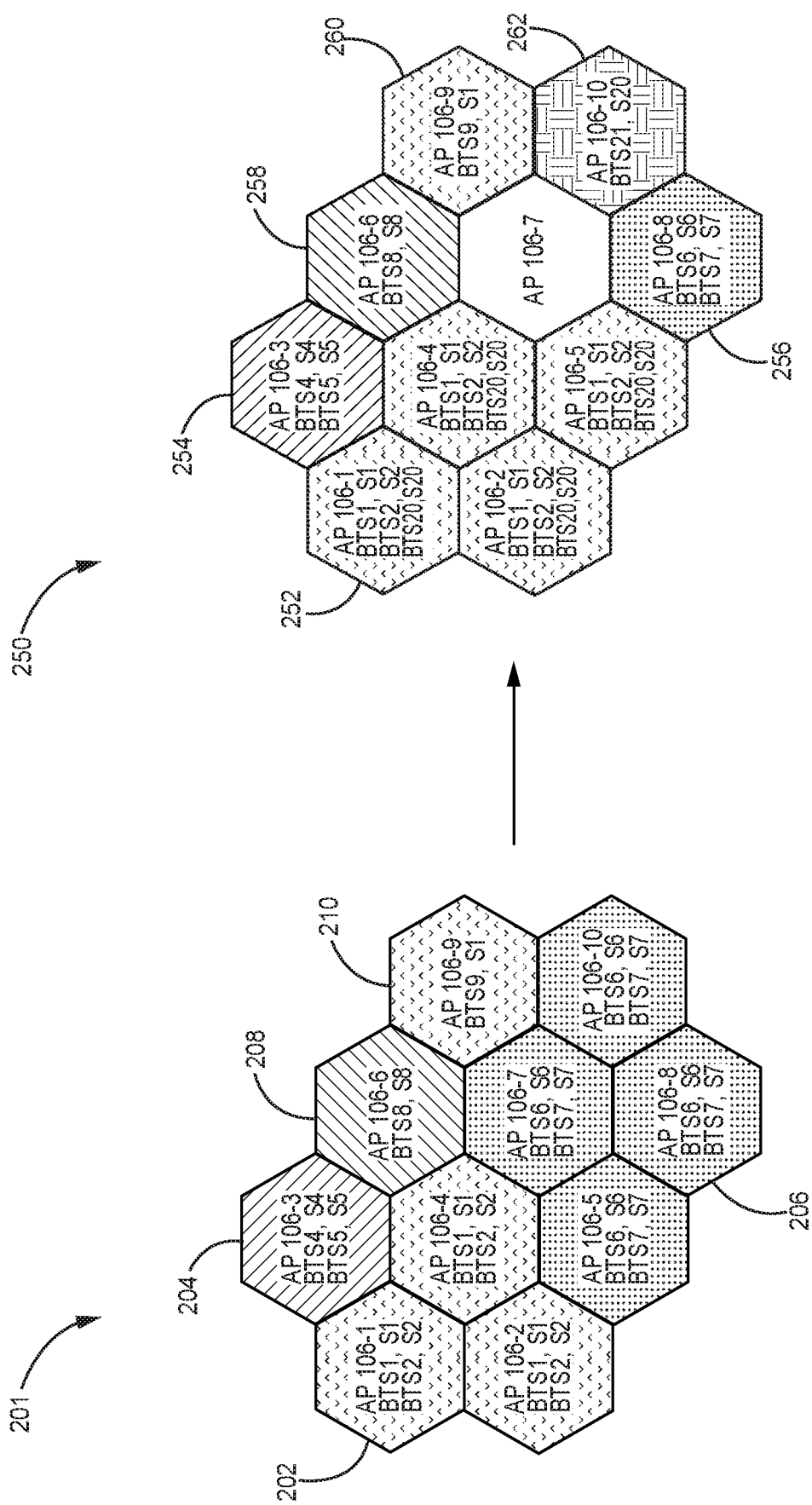

In some examples, the controller 104 is configured to modify the configuration of the DAS 103 by adjusting the size of the coverage zones formed by the remote antenna units 106 of the DAS 103. The size of a coverage zone can be increased to reduce the number of handovers between coverage zones, for example, and the controller 104 is configured to increase the size of a coverage zone by adding a remote antenna unit 106 to a coverage zone. In the example shown in FIG. 2B, the first coverage zone 202 is increased by adding AP 106-5, so the modified first coverage zone 252 includes AP 106-1, AP 106-2, AP 106-4, and AP 106-5. The size of a coverage zone can also be decreased to reduce the load of a base station servicing the coverage zone, for example, and the controller 104 is configured to decrease the size of a coverage zone by removing a remote antenna unit 106 from a coverage zone. In the example shown in FIG. 2B, the size of the third coverage zone 206 is decreased by removing AP 106-5, AP 106-7, and AP 106-10, so the updated third coverage zone 256 includes only AP 106-8.

In some examples, the controller 104 is configured to modify the configuration of a group of remote antenna units 106 by adjusting the capacity allocation to one or more of the coverage zones formed by the remote antenna units 106. The controller 104 is configured to increase the capacity allocation to a particular zone by adding a base station sector to the particular coverage zone. In the example shown in FIG. 2B, the capacity of the first coverage zone 202 is increased by adding a sector (BTS 20, S20) to the updated first coverage zone 252.

Similarly, the controller 104 is configured to decrease the capacity allocation to a particular coverage zone by removing a base station sector from a particular coverage zone. In the example shown in FIG. 2B, the capacity for AP 106-7 is removed due to inactivity. In some examples, a base station sector that is removed from one coverage zone is added to a different coverage zone in the telecommunications system 100, which amounts to a reallocation of capacity among coverage zones of the DAS 103.

In some examples, the controller 104 is configured to modify the settings for sensors and/or actuators within or near the remote antenna units 106 that are not under control of the DAS controller. In some examples, the sensor can include a camera mounted at the remote antenna unit 106 to count the amount of people in a given area. In such examples, the controller 104 can be configured to modify operation of the camera and/or adjust the camera direction. In other examples, other types of sensors could be used (for example, a photo-electric guard to count the number of cars passing a given area or a train arrival, etc.). Also, in some examples, the controller 104 can be configured to modify actuators for antenna related functions (tilt, switching to another antenna, changing antenna radiation sector, changing antenna radiation characteristics, etc.) in order to optimize the coverage area of particular remote antenna units 106. In some such examples, the controller 104 can also be configured to control functions of a smart antenna (for example, beamforming) for a remote antenna unit 106.

In some examples, the telecommunications system 100, at least in part, replaces or supplements the use of dedicated cables to transport data between components of a DAS 103 by using general-purpose public infrastructure backbone networks to establish virtual cable connections between DAS 103 components. Such public infrastructure backbone networks are typically used to carry digital data for services to the public such as but not limited to telephony, internet, television, and other data and/or entertainment services. With one or more of the examples disclosed herein, such backbone networks are leveraged to further transport the digital transmission of RF signals of a DAS. Such examples provide an advantage in flexibility over a DAS that employs a dedicated cable system. For example, transport resources between DAS components can be allocated on the backbone network according to actual need. DAS re-configurations can be performed virtually without the need to install new cables. DAS coverage expansions and extensions can be achieved by establishing connections between new DAS components and the backbone network. DAS components can be distributed across the backbone network and need not have a physical proximity with each other. Multiple DAS systems can be implemented via a backbone network, and DAS components can be re-assigned between different DAS systems without cable changes, or redundancy scenarios established. A common management system (such as an ONAP, Open Networking Automation Platform, for example) can coordinate both changes in the infrastructure and the DAS system (independent of equipment component suppliers).

In some examples, the controller 104 is further communicatively coupled to the public infrastructure backbone network via one or more communication links (for example, using a USB or Ethernet links) or networks (for example, USB, electrical, optical, Ethernet, SONET, etc.). As part of the determination of the updated DAS configuration, the controller 104 is further configured to consider the public infrastructure backbone configuration and to modify the configuration of one or more DASs 103 and components of the public infrastructure backbone network to improve performance of the telecommunications system 100. For example, the virtual cable connection between components of the DAS 103 can be modified in order to route capacity from a particular base station from one location to another.

In some examples, the master unit 105 and the remote antenna units 106 are configured to communicate data related to the configuration of the remote antenna units 106 using communication links separate from the communication links 107 used to communicate the wireless signals. In other examples, a portion of the bandwidth of communications over communication links 107 is utilized for communicating data related to capacity allocation for the remote antenna units 106. For example, part of the communication frame can be used to create a 1 gigabit link between the master unit 105 and remote antenna units 106 using the communication links 107. The master unit 105 can include a switch to add control signals to the downlink data streams to activate or otherwise modify the frequency bands or other operational parameters of the remote antenna units 106. In some examples, the master unit 105 is configured to instruct or command a particular remote antenna unit 106 to shut down or enter a lower power mode when reducing the capacity provided to the particular remote antenna unit 106. For example, in the example shown in FIG. 2B, when the capacity for AP 106-7 is removed due to inactivity, the master unit 105 can also be configured to instruct AP 106-7 to switch to a low power mode. It should be understood that other protocols for framing the data communicated between the master unit 105 and the remote antenna units 106 could also be used.

The controller 104 of the telecommunications system 100 can provide significant benefits in particular use cases (such as, for example, a railway or stadium) where the capacity demands vary greatly. In the particular use case of the railway, the controller 104 can be configured to determine when trains will arrive at and depart from particular areas and approximate when the base station sectors need to be rerouted among the different coverage zones. By taking into account the train information and current base station performance parameters, the controller 104 can be configured to route sufficient capacity to accommodate the mobile devices 108 on a train or at a train station at the correct time in the particular coverage zone of the DAS 103. For example, a main train station of a metropolitan area may have a significant amount of traffic during the commuting hours for workers on weekdays, but little to no traffic during the workday itself. The capacity allocated to the train during commuting hours can be redistributed to the city where the workers are located during weekdays.

Further, since the passengers of a train do not change when the train is moving from station to station, the controller 104 can be configured to allocate one or more base station sectors to follow the train such that handovers of the mobile devices 108 on the train does not occur. In other words, the controller 104 can be configured to provide a moving cell of capacity to a train that has a predefined route. For example, if the train follows a route from AP 106-3 to AP 106-6 to AP 106-9, the controller 104 can be configured to reconfigure the DAS 103 to move the same base station sector(s) to AP 106-3, AP 106-6, and AP 106-9 at the times where the train is passing through the coverage zone of the respective access point. If the same sector(s) are provided to the train, the mobile devices 108 can be serviced without required handovers even though the position is changing constantly.

Figure 3:
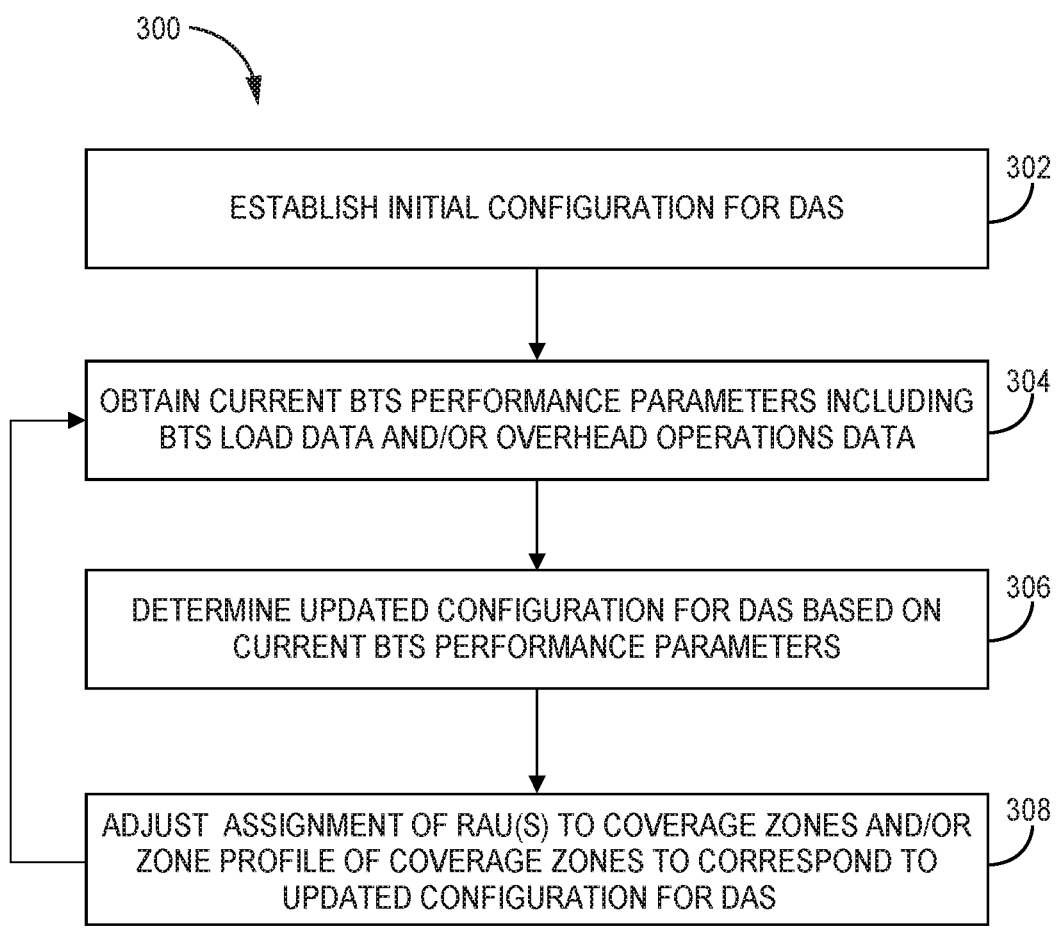
FIG. 3 is a flow diagram of an example method of improving performance of a telecommunications system.

FIG. 3 is a flow diagram of an example method 300 of capacity allocation for a remote antenna unit. The common features discussed above with respect to telecommunications system 100 in FIGS. 1-2B can include similar characteristics to those discussed with respect to method 300 and vice versa.

Method 300 begins with establishing an initial configuration for the DAS (block 302). In some examples, the initial configuration is established by the network operator. In other examples, the initial configuration is established by the controller in the telecommunications system. The initial configuration can be determined during radio network planning for the telecommunications system.

The method 300 further includes obtaining current base station performance parameters from a plurality of base stations (block 304). In some examples, the current base station performance parameters include usage data for the base station 102 that is L2/L3 data, which is also referred to higher-layer data. The higher-layer data from the base station 102 is demodulated and decoded data and contains control-plane and/or user-plane data. In some examples, the higher-layer data includes current base station load data and/or the current overhead communication traffic levels. The base station load data can include the percent of capacity for the sectors of the base station that is currently utilized, the available frequencies for the base station, the number of mobiles currently being served by the base station, or the like. The overhead communication traffic levels can include the number of handovers or other types of overhead communications for each respective base station in the telecommunications system.

In some examples, method 300 further includes determining an updated configuration for the DAS based on the current base station performance parameters (block 306). In some examples, determining an updated configuration for the DAS based on the current base station performance parameters includes comparing the current base station performance parameters to target base station performance parameters provided by the network operator or determined by a controller of the telecommunications system. In some examples, if the base station load data for a particular base station is above a threshold, block 306 includes determining modifications to the configuration of the DAS to cause the base station load data to decrease the load on that particular base station. For example, the number of remote antenna units in the coverage zone served by that particular base station can be reduced to decrease the base station load.

In some examples, determining an updated configuration for the DAS is also based on other parameters in addition to the higher-layer data discussed above, which can be used to predict future base station load or overhead communications. In some examples, block 306 includes obtaining statistical data regarding past base station performance parameters, a time of day, and/or known schedules that could affect the capacity requirements for certain coverage areas and predicting the future load or overhead requirements based on the schedules. The schedules could include, for example, a train schedule, a schedule of events at a stadium or concert hall, etc. In particular implementations where the DAS provides coverage to a rail track or entertainment venues, these schedules provide information about the amount of potential mobile device users that will be in the coverage area at a particular time.

In some examples, the determination of an updated configuration for the DAS based on the current base station performance parameters is performed by a controller using classical optimization algorithms. For example, the controller uses target base station performance parameters as a reference and takes the higher-layer data and the additional data as input parameters, performs calculations and outputs the determined updated configuration of the DAS, which includes the zone profiles for the remote antenna units of the DAS. In some examples, the controller is configured to determine the updated configuration of the DAS using a mathematical function or methods of artificial intelligence, such as a user trained neural network or deep learning algorithm where the controller trains itself to determine the optimum configuration for the DAS. In such examples, the controller can use past base station performance parameters, train or venue schedules, and/or statistical data regarding past base station performance parameters as training data. In some examples, the controller is configured to use 90% of training data for training and 10% of the training data for verification.

Method 300 further includes modifying the configuration of the DAS to correspond to the determined updated configuration of the DAS (block 308). In some examples, modifying the configuration of the DAS includes providing instructions or commands to the master unit of the DAS to cause the master to adjust the configuration of the remote antenna units of the DAS to correspond to the determined updated or improved configuration of the DAS. In some examples, the instructions or commands include the particular zone profile for each remote antenna unit of the DAS, which includes the particular base station sectors to be provided to the remote antenna units. In such examples, the master unit adjusts the base station sectors provided to each remote antenna unit to correspond to the particular zone profile determined by the controller. In some examples, the master unit is configured to adjust the sectors provided to each remote antenna unit by modifying the configuration of switches of a switch matrix.

In some examples, modifying the configuration of the DAS includes adjusting the gain and power settings of one or more components in the DAS. The gain and power settings of components in the DAS can be adjusted to ensure a desired cell size and/or RF performance inside a cell. In some examples, adjusting the gain and power settings of components in the DAS includes adjusting the output power of a remote antenna unit in the downlink direction in order to increase the size of the coverage area of the remote antenna unit. In some examples, adjusting the gain and power settings of components in the DAS includes adjusting the uplink gain of the DAS, which could be used to achieve a target downlink to uplink gain ratio to ensure optimum RF performance or to increase/decrease the received noise level at the base station.

In some examples, modifying the configuration of the DAS includes adjusting the size of the coverage zones formed by the remote antenna units of the DAS. In some examples, the size of a coverage zone can be increased by adding a remote antenna unit to the coverage zone. In some examples, the size of the coverage zone can be decreased by removing a remote antenna unit from the coverage zone. In some examples, the modifying of the configuration of the DAS includes adjusting the capacity allocation to one or more of the coverage zones formed by the remote antenna units. In some examples, the capacity allocation for a particular coverage zone can be increased by adding a base station sector to the particular coverage zone. In some examples, the capacity allocation for a particular coverage zone can be decreased by removing a base station sector from the particular coverage zone.

In some examples, the signals to be re-routed can be pre-defined to some extent by the telecommunications system's owner/operator. For example, a system owner/operator may define a priority scheme where capacity is prioritized to coverage zones where high demand is predicted, such as, for example, at a stadium or concert hall during an event, but redistribute that capacity elsewhere when the stadium or concert hall is empty. Also, it could be the case that sufficient resources to meet the target parameters are not available. In some examples, the network operator or controller can identify coverage zones to prioritize in situations when the resources are not sufficient based on a number of factors (for example, base station load, surrounding environment, time of day, etc.).

Method 300 proceeds with repeating blocks 304-308 during operation of the telecommunications system to optimize performance of the DAS and the telecommunications system generally. The control loop of blocks 304-308 can be executed at predetermined intervals, which can be selected by the operator of the telecommunications network. For example, the controller can be configured to determine an updated DAS configuration for the DAS on the order of minutes (such as, for example, every 30 minutes). Other intervals could also be used.

Some of the examples described herein provide systems and methods that enhance performance of a DAS and a telecommunications system generally. By dynamically reconfiguring the DAS based on current base station performance parameters obtained from the base stations, the performance of the telecommunications system can be significantly improved compared to more static systems. In some situations, capital expenditures for the telecommunications system can be reduced because fewer base stations are needed to provide service throughout the coverage zones when the controller is operating. Further, by dynamically managing power consumption of the remote antenna units, the systems and methods described above can reduce operational expenditure for operating the remote antenna units and simultaneously enhances the mean time between failure since the overall power consumption of the remote antenna units is decreased. Further, since no intervention by a human operator is required for the controller to implement the control loop and optimize performance, the optimization of the DAS is more accurate and can occur more quickly.

Some examples described herein utilizing the virtual cable connections can also enhance performance of a DAS through better redundancy. For example, if a master unit fails, a different master unit could be used to route the signals to the related remote antenna units. A given master unit may have performance parameters to serve a certain amount of base station signal bandwidth and a certain number of remote antenna units. If only approximately 80% of the maximum performance of the master unit is used, the master unit may use the remaining 20% to partly take over the tasks of a failing master unit. Assuming that not all master units are loaded with 100%, a reconfiguration can compensate a single master unit failure. Similar redundancy benefits can be achieved for remote antenna units as well. For example, if one remote antenna unit fails, the adjacent remote antenna units may increase the output power/antenna tilt in order to feed the coverage area of the failing remote antenna unit.

In various aspects, system elements, method steps, or examples described throughout this disclosure (such as the controller, master unit, remote antenna units, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a telecommunications system, comprising: a distributed antenna system comprising a master unit communicatively coupled to a plurality of remote antenna units located remotely from the master unit, wherein the master unit is communicatively coupled to a plurality of base stations; and a controller communicatively coupled to the plurality of base stations and the distributed antenna system, wherein the controller is configured to: obtain one or more current base station performance parameters including base station load data or overhead communications data from the plurality of base stations; determine an updated configuration for the distributed antenna system based on the one or more current base station performance parameters, wherein the configuration of the distributed antenna system comprises an assignment of the plurality of remote antenna units to one or more coverage zones and an assignment of a zone profile to each coverage zone of the one or more coverage zones; and adjust the assignment of the plurality of remote antenna units to the one or more coverage zones and/or the zone profile of each coverage zone to correspond to the determined updated configuration for the distributed antenna system.

Example 2 includes the telecommunications system of Example 1, wherein the controller is configured to the determine the updated configuration for the distributed antenna system based on the one or more current base station performance parameters and to adjust the assignment of the plurality of remote antenna units to the one or more coverage zones and/or the zone profile of each coverage zone to correspond to the determined updated configuration for the distributed antenna system automatically or using a control loop.

Example 3 includes the telecommunications system of any of Examples 1-2, wherein the controller and distributed antenna system are configured so that the controller is within a management domain of the distributed antenna system.

Example 4 includes the telecommunications system of any of Examples 1-3, wherein the controller is further configured to compare the one or more current base station parameters with one or more target base station parameters, wherein the controller is configured to further determine the updated configuration for the distributed antenna system based on the comparison of the one or more current base station parameters with one or more target base station parameters.

Example 5 includes the telecommunications system of any of Examples 1-4, wherein the one or more current base station parameters include base station load data for each base station of the plurality of base stations, wherein the controller is configured to determine the updated configuration of the distributed antenna system such that the base station load for each base station of the plurality of base stations is below a threshold.

Example 6 includes the telecommunications system of any of Examples 1-5, wherein the one or more current base station parameters include a number of handovers to and from each base station of the plurality of base stations, wherein the controller is configured to determine the updated configuration of the distributed antenna system such that the number of handovers between the plurality of base stations is reduced.

Example 7 includes the telecommunications system of Example 6, wherein the controller is configured to remove at least one remote antenna unit from a first coverage area and to add the at least one remote antenna unit to a second coverage area such that the number of handovers between the first coverage area and the second coverage area is reduced.

Example 8 includes the telecommunications system of any of Examples 1-7, wherein the controller is configured to obtain at least one additional parameter in addition to the one or more current base station performance parameters, wherein the controller is further configured to determine the updated configuration of the distributed antenna system based on the at least one additional parameter.

Example 9 includes the telecommunications system of any of Examples 1-8, wherein the controller is further configured to modify the configuration of the distributed antenna system by adjusting the gain and/or power settings of one or more components in the distributed antenna system.

Example 10 includes a method, comprising: obtaining, with a controller, one or more current base station performance parameters including base station load data or overhead communications data from a plurality of base stations; determining, with the controller, an updated configuration for a distributed antenna system based on the one or more current base station performance parameters, wherein the distributed antenna system includes a master unit communicatively coupled to the plurality of base stations and a plurality of remote antenna units located remotely from the master unit and communicatively coupled to the master unit, wherein the configuration of the distributed antenna system comprises an assignment of the plurality of remote antenna units to one or more coverage zones and an assignment of a zone profile to each coverage zone of the one or more coverage zones; and adjusting the assignment of the plurality of remote antenna units to the one or more coverage zones and/or the zone profile of each coverage zone to correspond to the determined updated configuration for the distributed antenna system.

Example 11 includes the method of Example 10, further comprising: comparing the one or more current base station parameters with one or more target base station parameters; and determining the updated configuration for the distributed antenna system based on the comparison of the one or more current base station parameters with one or more target base station parameters.

Example 12 includes the method of any of Examples 10-11, wherein the one or more current base station parameters include base station load data for each base station of the plurality of base stations; wherein determining an updated configuration for a distributed antenna system based on the one or more current base station performance parameters comprises determining the updated configuration of the distributed antenna system such that the base station load for each base station of the plurality of base stations is below a threshold.

Example 13 includes the method of Example 12, wherein determining an updated configuration for a distributed antenna system based on the one or more current base station performance parameters comprises: comparing the base station load data for each base station of the plurality of base stations to a threshold value; determining whether the base station load data for a first base station of the plurality of base stations exceeds the threshold value; and removing at least one remote antenna unit from a coverage zone associated with a sector of the first base station in response to the base station load data for a first base station of the plurality of base stations exceeding the threshold value.

Example 14 includes the method of any of Examples 10-13, further comprising: obtaining at least one additional parameter in addition to the one or more current base station performance parameters; and determining the updated configuration of the distributed antenna system based on the at least one additional parameter.

Example 15 includes the method of any of Examples 10-14, wherein determining the updated configuration for a distributed antenna system based on the one or more current base station performance parameters includes using a classical optimization algorithm or artificial intelligence.

Example 16 includes a controller for a telecommunications system, comprising: a processing device; and a non-transitory computer-readable medium having program code stored thereon, wherein the program code is executable for performing operations comprising: obtaining one or more current base station performance parameters including base station load data or overhead communications data from a plurality of base stations; determining an updated configuration for a distributed antenna system based on the one or more current base station performance parameters, wherein the distributed antenna system includes a master unit communicatively coupled to the plurality of base stations and a plurality of remote antenna units located remotely from the master unit and communicatively coupled to the master unit, wherein the configuration of the distributed antenna system comprises an assignment of the plurality of remote antenna units to one or more coverage zones and an assignment of a zone profile to each coverage zone of the one or more coverage zones; and adjusting the assignment of the plurality of remote antenna units to the one or more coverage zones and/or the zone profile of each coverage zone to correspond to the determined updated configuration for the distributed antenna system.

Example 17 includes the controller of Example 16, wherein the controller is configured to the determine the updated configuration for the distributed antenna system based on the one or more current base station performance parameters and to adjust the assignment of remote antenna units to the one or more coverage zones and/or the zone profile of each coverage zone to correspond to the determined updated configuration for the distributed antenna system as a zero-touch process such that no intervention from a human operator is necessary.

Example 18 includes the controller of Example 17, wherein the program code is further executable for performing operations comprising: comparing the one or more current base station parameters with one or more target base station parameters; and determining the updated configuration for the distributed antenna system based on the comparison.

Example 19 includes the controller of any of Examples 17-18, wherein the one or more current base station parameters include base station load data for each base station of the plurality of base stations; wherein determining an updated configuration for a distributed antenna system based on the one or more current base station performance parameters comprises determining the updated configuration of the distributed antenna system such that the base station load for each base station of the plurality of base stations is below a threshold.

Example 20 includes the controller of Example 19, wherein the one or more current base station parameters include a number of handovers to and from each base station of the plurality of base stations; wherein determining an updated configuration for a distributed antenna system based on the one or more current base station performance parameters comprises determining the updated configuration of the distributed antenna system such that the number of handovers between the plurality of base stations is reduced.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A telecommunications system, comprising:
a distributed antenna system comprising a master unit communicatively coupled to a plurality of remote antenna units located remotely from the master unit, wherein the master unit is communicatively coupled to a plurality of base stations; and
a controller communicatively coupled to the plurality of base stations and the distributed antenna system, wherein the controller is configured to receive demodulated and decoded data from the plurality of base stations, wherein the controller is configured to:
obtain one or more current base station performance parameters including base station load data or overhead communications data from the plurality of base stations;
determine an updated configuration for the distributed antenna system based on the one or more current base station performance parameters, wherein the configuration of the distributed antenna system comprises an assignment of the plurality of remote antenna units to one or more coverage zones and an assignment of a zone profile to each coverage zone of the one or more coverage zones, wherein the zone profile includes a set of one or more sectors and a corresponding sector profile for each sector in the set of one or more sectors; and
adjust the assignment of the plurality of remote antenna units to the one or more coverage zones and/or the zone profile of each coverage zone to correspond to the determined updated configuration for the distributed antenna system.

2. The telecommunications system of claim 1, wherein the controller is configured to the determine the updated configuration for the distributed antenna system based on the one or more current base station performance parameters and to adjust the assignment of the plurality of remote antenna units to the one or more coverage zones and/or the zone profile of each coverage zone to correspond to the determined updated configuration for the distributed antenna system automatically or using a control loop.

3. The telecommunications system of claim 1, wherein the controller and distributed antenna system are configured so that the controller is within a management domain of the distributed antenna system.

4. The telecommunications system of claim 1, wherein the controller is further configured to compare the one or more current base station performance parameters with one or more target base station parameters, wherein the controller is configured to further determine the updated configuration for the distributed antenna system based on the comparison of the one or more current base station performance parameters with one or more target base station parameters.

5. The telecommunications system of claim 1, wherein the one or more current base station performance parameters include base station load data for each base station of the plurality of base stations, wherein the controller is configured to determine the updated configuration of the distributed antenna system such that the base station load for each base station of the plurality of base stations is below a threshold.

6. The telecommunications system of claim 1, wherein the one or more current base station performance parameters include a number of handovers to and from each base station of the plurality of base stations, wherein the controller is configured to determine the updated configuration of the distributed antenna system such that the number of handovers between the plurality of base stations is reduced.

7. The telecommunications system of claim 6, wherein the controller is configured to remove at least one remote antenna unit from a first coverage area and to add the at least one remote antenna unit to a second coverage area such that the number of handovers between the first coverage area and the second coverage area is reduced.

8. The telecommunications system of claim 1, wherein the controller is configured to obtain at least one additional parameter in addition to the one or more current base station performance parameters, wherein the controller is further configured to determine the updated configuration of the distributed antenna system based on the at least one additional parameter.

9. The telecommunications system of claim 1, wherein the controller is further configured to modify the configuration of the distributed antenna system by adjusting a gain and/or power settings of one or more components in the distributed antenna system.

10. A method, comprising:
obtaining, with a controller, one or more current base station performance parameters including base station load data or overhead communications data from a plurality of base stations, wherein the controller is communicatively coupled to the plurality of base stations and a distributed antenna system, wherein the controller is configured to receive demodulated and decoded data from the plurality of base stations;
determining, with the controller, an updated configuration for the distributed antenna system based on the one or more current base station performance parameters, wherein the distributed antenna system includes a master unit communicatively coupled to the plurality of base stations and a plurality of remote antenna units located remotely from the master unit and communicatively coupled to the master unit, wherein the configuration of the distributed antenna system comprises an assignment of the plurality of remote antenna units to one or more coverage zones and an assignment of a zone profile to each coverage zone of the one or more coverage zones, wherein the zone profile includes a set of one or more sectors and a corresponding sector profile for each sector in the set of one or more sectors; and
adjusting the assignment of the plurality of remote antenna units to the one or more coverage zones and/or the zone profile of each coverage zone to correspond to the determined updated configuration for the distributed antenna system.

11. The method of claim 10, further comprising:
comparing the one or more current base station performance parameters with one or more target base station parameters; and
determining the updated configuration for the distributed antenna system based on the comparison of the one or more current base station performance parameters with one or more target base station parameters.

12. The method of claim 10, wherein the one or more current base station performance parameters include base station load data for each base station of the plurality of base stations;
wherein determining an updated configuration for a distributed antenna system based on the one or more current base station performance parameters comprises determining the updated configuration of the distributed antenna system such that the base station load for each base station of the plurality of base stations is below a threshold.

13. The method of claim 12, wherein determining an updated configuration for a distributed antenna system based on the one or more current base station performance parameters comprises:
comparing the base station load data for each base station of the plurality of base stations to a threshold value;
determining whether the base station load data for a first base station of the plurality of base stations exceeds the threshold value; and
removing at least one remote antenna unit from a coverage zone associated with a sector of the first base station in response to the base station load data for a first base station of the plurality of base stations exceeding the threshold value.

14. The method of claim 10, further comprising:
obtaining at least one additional parameter in addition to the one or more current base station performance parameters; and
determining the updated configuration of the distributed antenna system based on the at least one additional parameter.

15. The method of claim 10, wherein determining the updated configuration for a distributed antenna system based on the one or more current base station performance parameters includes using a classical optimization algorithm or artificial intelligence.

16. A controller for a telecommunications system, comprising:
a processing device; and
a non-transitory computer-readable medium having program code stored thereon, wherein the program code is executable for performing operations comprising:
obtaining one or more current base station performance parameters including base station load data or overhead communications data from a plurality of base stations, wherein the controller is configured to be communicatively coupled to the plurality of base stations and a distributed antenna system, wherein the controller is configured to receive demodulated and decoded data from the plurality of base stations;
determining an updated configuration for the distributed antenna system based on the one or more current base station performance parameters, wherein the distributed antenna system includes a master unit communicatively coupled to the plurality of base stations and a plurality of remote antenna units located remotely from the master unit and communicatively coupled to the master unit, wherein the configuration of the distributed antenna system comprises an assignment of the plurality of remote antenna units to one or more coverage zones and an assignment of a zone profile to each coverage zone of the one or more coverage zones, wherein the zone profile includes a set of one or more sectors and a corresponding sector profile for each sector in the set of one or more sectors; and
adjusting the assignment of the plurality of remote antenna units to the one or more coverage zones and/or the zone profile of each coverage zone to correspond to the determined updated configuration for the distributed antenna system.

17. The controller of claim 16, wherein the controller is configured to the determine the updated configuration for the distributed antenna system based on the one or more current base station performance parameters and to adjust the assignment of remote antenna units to the one or more coverage zones and/or the zone profile of each coverage zone to correspond to the determined updated configuration for the distributed antenna system as a zero-touch process such that no intervention from a human operator is necessary.

18. The controller of claim 17, wherein the program code is further executable for performing operations comprising:
comparing the one or more current base station performance parameters with one or more target base station parameters; and
determining the updated configuration for the distributed antenna system based on the comparison.

19. The controller of claim 17, wherein the one or more current base station performance parameters include base station load data for each base station of the plurality of base stations;
wherein determining an updated configuration for a distributed antenna system based on the one or more current base station performance parameters comprises determining the updated configuration of the distributed antenna system such that the base station load for each base station of the plurality of base stations is below a threshold.

20. The controller of claim 19, wherein the one or more current base station performance parameters include a number of handovers to and from each base station of the plurality of base stations;
wherein determining an updated configuration for a distributed antenna system based on the one or more current base station performance parameters comprises determining the updated configuration of the distributed antenna system such that the number of handovers between the plurality of base stations is reduced.

* * * * *